(12) United States Patent
Chang et al.

(10) Patent No.: US 11,041,721 B2
(45) Date of Patent: Jun. 22, 2021

(54) COMPASS DEVICE

(71) Applicant: CHUAN CHING MECHANICAL INDUSTRIAL CO., LTD., Taichung (TW)

(72) Inventors: Chiao-Hu Chang, Taichung (TW); Wen-Ching Chang, Taichung (TW); Shen-Wei Chang, Taichung (TW)

(73) Assignee: CHUAN CHING MECHANICAL INDUSTRIAL CO., LTD., Taichung (TW)

( * ) Notice: Subject to any disclaimer, the term of this patent is extended or adjusted under 35 U.S.C. 154(b) by 100 days.

(21) Appl. No.: 16/693,580

(22) Filed: Nov. 25, 2019

(65) Prior Publication Data

US 2021/0055106 A1    Feb. 25, 2021

(30) Foreign Application Priority Data

Aug. 22, 2019 (TW) .................................. 108130041

(51) Int. Cl.
| | |
|---|---|
| G01C 17/38 | (2006.01) |
| G01C 17/18 | (2006.01) |
| G01C 17/20 | (2006.01) |
| G01C 21/26 | (2006.01) |

(52) U.S. Cl.
CPC ............. *G01C 17/38* (2013.01); *G01C 17/18* (2013.01); *G01C 17/20* (2013.01); *G01C 21/265* (2013.01)

(58) Field of Classification Search
CPC ........ G01C 17/38; G01C 17/18; G01C 17/20; G01C 21/265; G01C 17/14; G01C 17/12; G01C 17/04
USPC ........................................................... 33/356
See application file for complete search history.

(56) References Cited

U.S. PATENT DOCUMENTS

| | | | | |
|---|---|---|---|---|
| 4,629,272 A | * | 12/1986 | Mattingly ............ | H01R 13/625 439/318 |
| D674,296 S | * | 1/2013 | Chang ............................ | D10/68 |
| 8,992,487 B2 | * | 3/2015 | Eich ......................... | A61M 5/20 604/211 |
| 9,277,105 B2 | * | 3/2016 | Olsson ................. | H04N 5/2254 |
| 9,690,390 B2 | * | 6/2017 | Olsson .................... | G06F 3/016 |
| 2013/0160311 A1 | * | 6/2013 | Chang .................... | G01C 23/00 33/352 |
| 2014/0340372 A1 | * | 11/2014 | Olsson .................. | G06F 3/0338 345/184 |
| 2016/0158445 A1 | * | 6/2016 | Eich ........................ | A61M 5/20 604/235 |
| 2019/0290851 A1 | * | 9/2019 | Eich ........................ | A61M 5/20 |
| 2021/0055106 A1 | * | 2/2021 | Chang .................... | G01C 17/18 |

* cited by examiner

*Primary Examiner* — Yaritza Guadalupe-McCall

(57) ABSTRACT

A compass device includes a base seat, a vial unit received in an accommodation hole of the base seat, an azimuth unit rotatably sleeved around the vial unit, a first spring wire disposed to resiliently retain the vial unit to the azimuth unit for magnetic declination adjustment, and a second spring wire disposed to resiliently retain the azimuth unit to the base seat for bearing angle measurement.

10 Claims, 9 Drawing Sheets

COMPASS DEVICE

CROSS-REFERENCE TO RELATED APPLICATION

This application claims priority of Taiwanese Patent Application No. 108130041, filed on Aug. 22, 2019.

FIELD

The disclosure relates to a compass device, and more particularly to a compass device with a magnetic declination adjustment.

BACKGROUND

Generally, a compass and a map are used to determine the route of travel. Since the magnetic north pointed by the magnetic needle of the compass is not equal to geographic north (i.e. true north) in terms of which the map is drawn, and there is a magnetic declination therebetween that varies depending on the positions on the Earth's surface, a conventional compass needs a magnetic declination adjustment so as to facilitate bearing angle measurement. To handle the declination adjustment, a tool, such as a screw driver, is often required to rotate an adjustment screw bolt in the compass to rotate a capsule. Hence, the declination adjustment is inconvenient, and the compass is complicated in structure and results in inconvenient assembly and high manufacturing costs.

SUMMARY

Therefore, an object of the disclosure is to provide a compass device that can alleviate at least one of the drawbacks of the prior art.

According to the disclosure, the compass device includes a base seat, a vial unit, an azimuth unit, a first spring wire and a second spring wire. The base seat has an accommodation hole which is bordered by an inner peripheral surface, and an orientation reading line. The vial unit includes a vial housing which is received in the accommodation hole and spaced apart from the inner peripheral surface, a rotatable magnetic needle which is disposed in the vial housing, and an orientation aligning line and an orientation aligning arrow which are formed on the vial housing and below the magnetic needle. The azimuth unit includes a rotary sleeve member which is received in the accommodation hole and which is rotatably sleeved around the vial housing, and an azimuth ring which is retained on the rotary sleeve member and which surrounds the magnetic needle, the orientation aligning line and the orientation aligning arrow. The first spring wire is interposed between the vial housing and the rotary sleeve member. The first spring wire is bent to form a plurality of first clamping sections which are wrapped on the vial housing and each of which extends radially and outwardly to connect with two adjacent ones of the first clamping sections at two first junctures that abut against the rotary sleeve member to resiliently retain the vial housing to the rotary sleeve member and to permit rotation of the vial housing relative to the azimuth unit and position at an angular position for magnetic declination adjustment. The second spring wire is interposed between the rotary sleeve member and the inner peripheral surface of the base seat. The second spring wire is bent to form a plurality of second clamping sections which are wrapped on the rotary sleeve member and each of which extends radially and outwardly to connect with two adjacent ones of the second clamping sections at two second junctures that abut against the inner peripheral surface of the base seat to resiliently retain the rotary sleeve member to the base seat and to permit rotation of the azimuth unit and the vial housing relative to the base seat and position at an angular position for bearing angle measurement.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
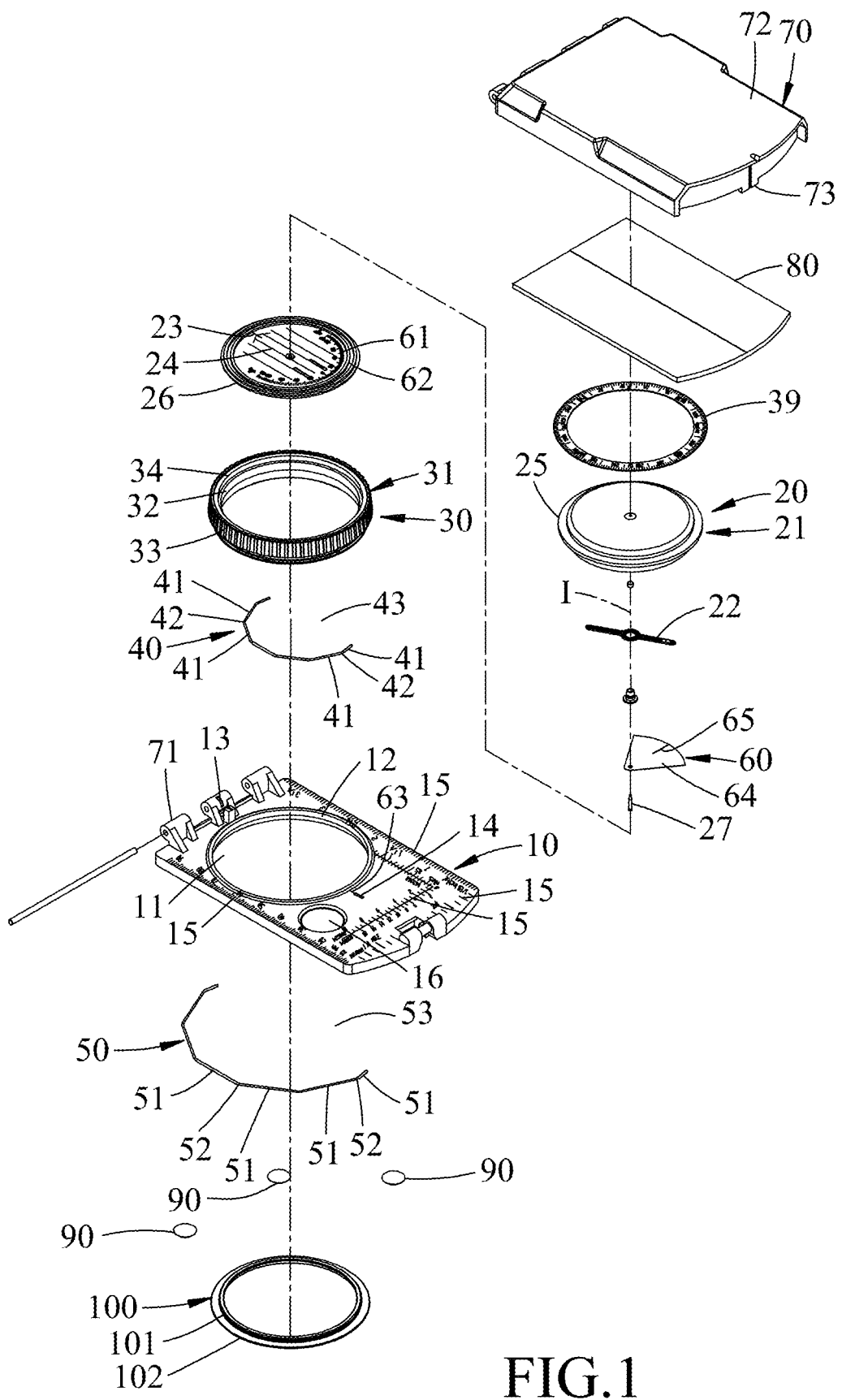
FIG. 1 is an exploded perspective view illustrating an embodiment of a compass device according to the disclosure.
Figure 2:
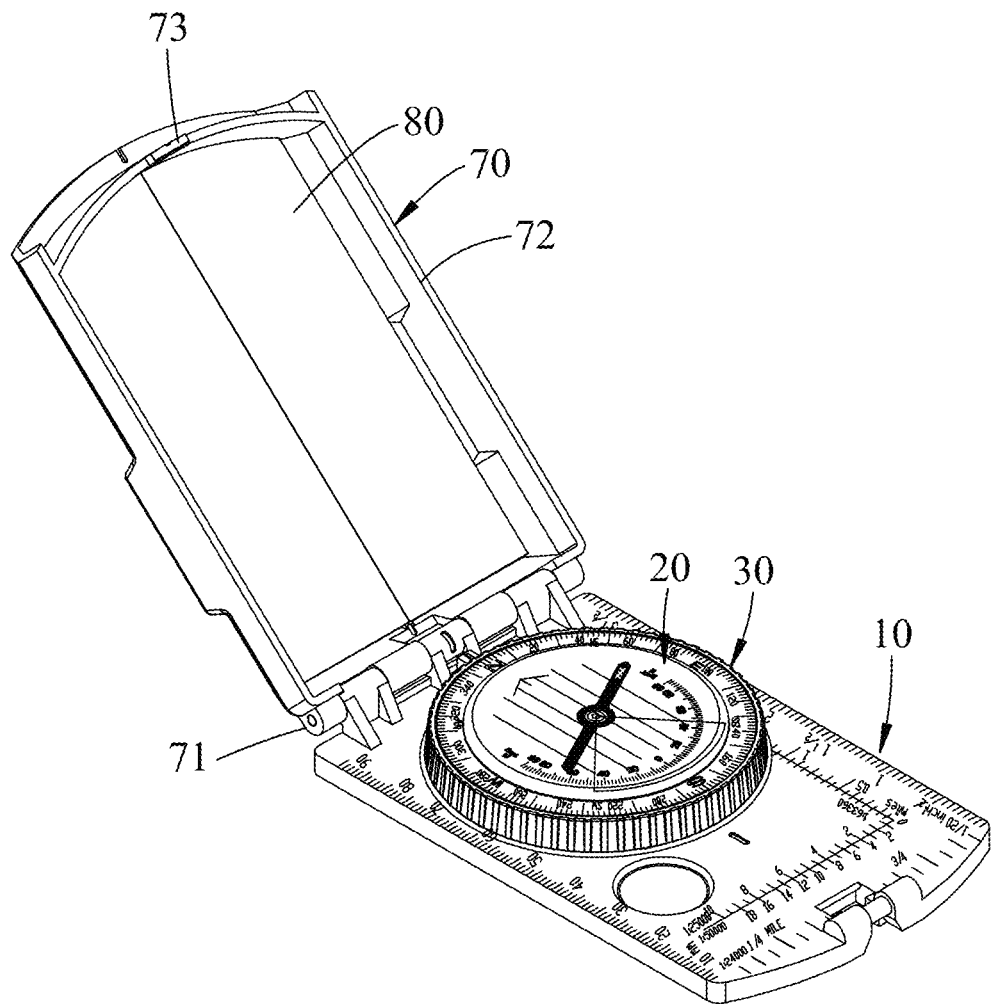
FIG. 2 is a perspective view of the embodiment in an opened state.
Figure 3:
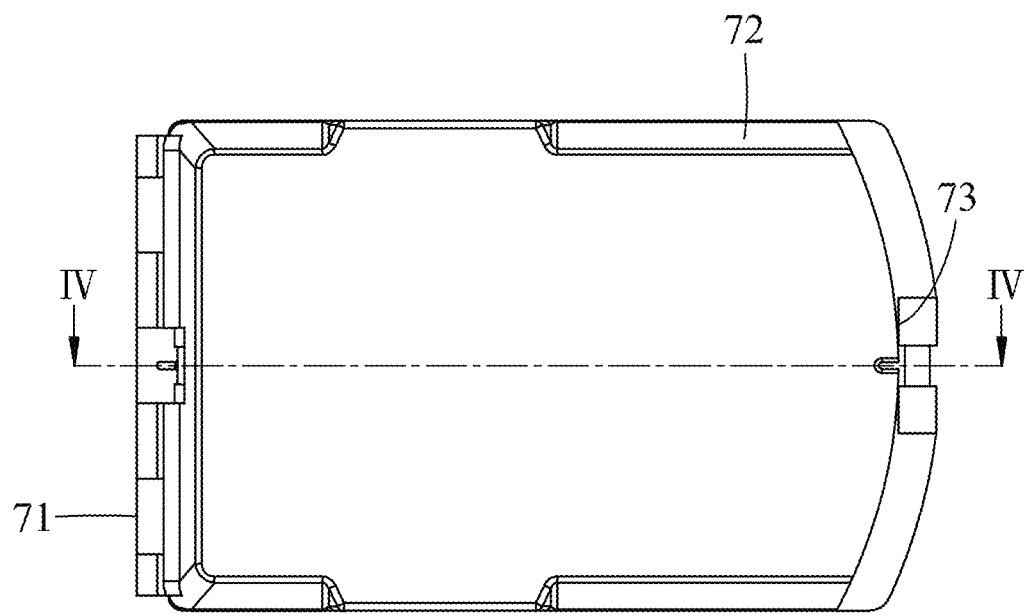
FIG. 3 is a schematic top view of the embodiment in a closed state.

To aid in describing the disclosure, directional terms may be used in the specification and claims to describe portions of the present disclosure (e.g., up, down, upper, lower, top, bottom, etc.). These directional definitions are intended to merely assist in describing and claiming the disclosure and are not intended to limit the disclosure in any way.

Referring to FIGS. 1 to 6, an embodiment of a compass device according to the disclosure includes a base seat 10, a vial unit 20, an azimuth unit 30, a first spring wire 40, a second spring wire 50, a slope measuring unit 60, an outer cover unit 70, a mirror 80, a plurality of anti-slip pads 90 and a surrounding cover member 100.

The base seat 10 is in the form of a rectangular-shaped transparent plate, and has an accommodation hole 11 which is bordered by an inner peripheral surface 12. An orientation reading line 13, an advancing line 14 angularly displaced from the orientation reading line 13 by 180 degrees, a plurality of architect's scales 15 and a magnifying glass 16 are disposed on the base seat 10. The inner peripheral surface 12 is stepped in a cross-section and has an upper small-diameter segment 121, a lower large-diameter segment 122, and a surrounding shoulder portion 123 (i.e., a fifth surrounding shoulder portion 123) formed between the upper small-diameter segment 121 and the lower large-diameter segment 122 and facing downwardly.

The vial unit 20 includes a vial housing 21 which is received in the accommodation hole 11 and spaced apart from the inner peripheral surface 12, a rotatable magnetic needle 22 which is rotatably disposed in the vial housing 21 about an axis (I), and an orientation aligning line 23 and an orientation aligning arrow 24 which are formed on the vial housing 21 and below the magnetic needle 22. The vial housing 21 has an upper shell half 25 and a lower shell half 26 coupled with each other to form an enclosed chamber 210 therein. The upper shell half 25 has a surrounding flange 251 which extends radially and outwardly. The lower shell half 26 has a surrounding insert protrusion 261 which extends upwardly and which is formed with a surrounding insert slot 262 for inserting engagement of the upper shell half 25, and a surrounding shoulder portion 263 (i.e., a fourth surrounding shoulder portion 263) which surrounds and is formed outwardly of the surrounding insert protrusion 261 and which faces upwardly.

The vial unit 20 further includes an insert pin 27 which extends in an up-and-down direction and through the lower shell half 26 into the enclosed chamber 210 to define the axis (I) such that the magnetic needle 22 is sleeved on the insert pin 27 to be rotatable about the axis (I).

The orientation aligning line 23 and the orientation aligning arrow 24 are printed or engraved on the lower shell half 26.

The azimuth unit 30 includes a rotary sleeve member 31 which is received in the accommodation hole 11 and which is rotatably sleeved around the vial housing 21, and an azimuth ring 39 which is retained on the rotary sleeve member 31 and which surrounds the magnetic needle 22, the orientation aligning line 23 and the orientation aligning arrow 24. The rotary sleeve member 31 has an inner sleeve surface 32, an outer sleeve surface 33, a top minor surface 34 which interconnects upper ends of the inner and outer sleeve surfaces 32, 33, a bottom minor surface 35 which interconnects lower ends of the inner and outer sleeve surfaces 32, 33, a surrounding upper concavity 36 which is formed in the top minor surface 34, and a surrounding protrusion 37 which protrudes from the inner sleeve surface 32 to form a first surrounding shoulder portion 372 that faces downwardly, and a third surrounding shoulder portion 371 that is above the first surrounding shoulder portion 372 and that faces upwardly. A second surrounding shoulder portion 38 is formed on the outer sleeve surface 33 and as a lower surface of a surrounding concavity to face upwardly. Specifically, the outer sleeve surface 33 has a lower smaller-diameter segment 332 which is disposed inwardly of the inner peripheral surface 12 of the base seat 10, an upper larger-diameter segment 331 which extends outwardly and upwardly of the base seat 10, and a shoulder seating portion 333 which is formed between the lower smaller-diameter segment 332 and the upper larger-diameter segment 331 and which faces downwardly to be seated against the base seat 10. The surrounding concavity is formed in the lower smaller-diameter segment 332 such that the second surrounding shoulder portion 38 is formed on the lower smaller-diameter segment 332.

The azimuth ring 39 is securely mounted on the top minor surface 34 and retained in the surrounding upper concavity 36.

The first spring wire 40 is interposed between the vial housing 21 and the rotary sleeve member 31. The first spring wire 40 is bent to form a plurality of first clamping sections 41 which are wrapped on the vial housing 21 and each of which extends radially and outwardly to connect with two adjacent ones of the first clamping sections 41 at two first junctures 42 that abut against the inner sleeve surface 32 of the rotary sleeve member 31 to resiliently retain the vial housing 21 to the rotary sleeve member 31 and to permit rotation of the vial housing 21 relative to the azimuth unit 30 and position at an angular position for magnetic declination adjustment.

In this embodiment, the first spring wire 40 is configured to be interrupted by a first opening 43 such that the first spring wire 40 can be deformed to resiliently expand from the first opening 43 for facilitating wrapping on the lower shell half 26. In assembly, when the vial unit 20 with the first spring wire 40 wrapped thereon is placed downwardly within the rotary sleeve member 31, the surrounding flange 251 is seated on the third surrounding shoulder portion 371, and the first junctures 42 of the first spring wire 40 abut against the first surrounding shoulder portion 372 so as to retain the vial unit 20 relative to the azimuth unit 30. Specifically, the first clamping sections 41 of the first spring wire 40 are mounted on the fourth surrounding shoulder portion 263, and the first junctures 42 abut against the first surrounding shoulder portion 372 such that the first spring wire 40 is retained between the first and fourth surrounding shoulder portions 372, 263 in the up-down direction, which enhances connecting retention between the vial unit 20 and the azimuth unit 30.

The second spring wire 50 is interposed between the rotary sleeve member 31 and the inner peripheral surface 12 of the base seat 10. The second spring wire 50 is bent to form a plurality of second clamping sections 51 which are wrapped on the rotary sleeve member 31 and each of which extends radially and outwardly to connect with two adjacent ones of the second clamping sections 51 at two second junctures 52 that abut against the inner peripheral surface 12 of the base seat 10 to resiliently retain the rotary sleeve member 31 to the base seat 10 and to permit rotation of the azimuth unit 30 and the vial housing 21 relative to the base seat 10 and position at an angular position for bearing angle measurement.

In this embodiment, the second spring wire 50 is configured to be interrupted by a second opening 53 such that the second spring wire 50 can be deformed to resiliently expand from the second opening 53 for facilitating wrapping on the outer sleeve surface 33 of the rotary sleeve member 31. In assembly, when the azimuth unit 30 with the second spring wire 50 wrapped thereon is placed downwardly in the accommodation hole 11 of the base seat 10, the shoulder seating portion 333 is seated on the base seat 10, and the second junctures 52 of the second spring wire 50 abut against the fifth surrounding shoulder portion 123 so as to retain the azimuth unit 30 relative to the base seat 10. Specifically, the second clamping sections 51 of the second spring wire 50 are mounted on the second surrounding shoulder portion 38, and the second junctures 52 abut against the fifth surrounding shoulder portion 123 such that the second spring wire 50 is retained between the second and fifth surrounding shoulder portions 38, 123 in the up-down direction, which enhances connecting retention between the azimuth unit 30 and the base seat 10.

Figure 4:
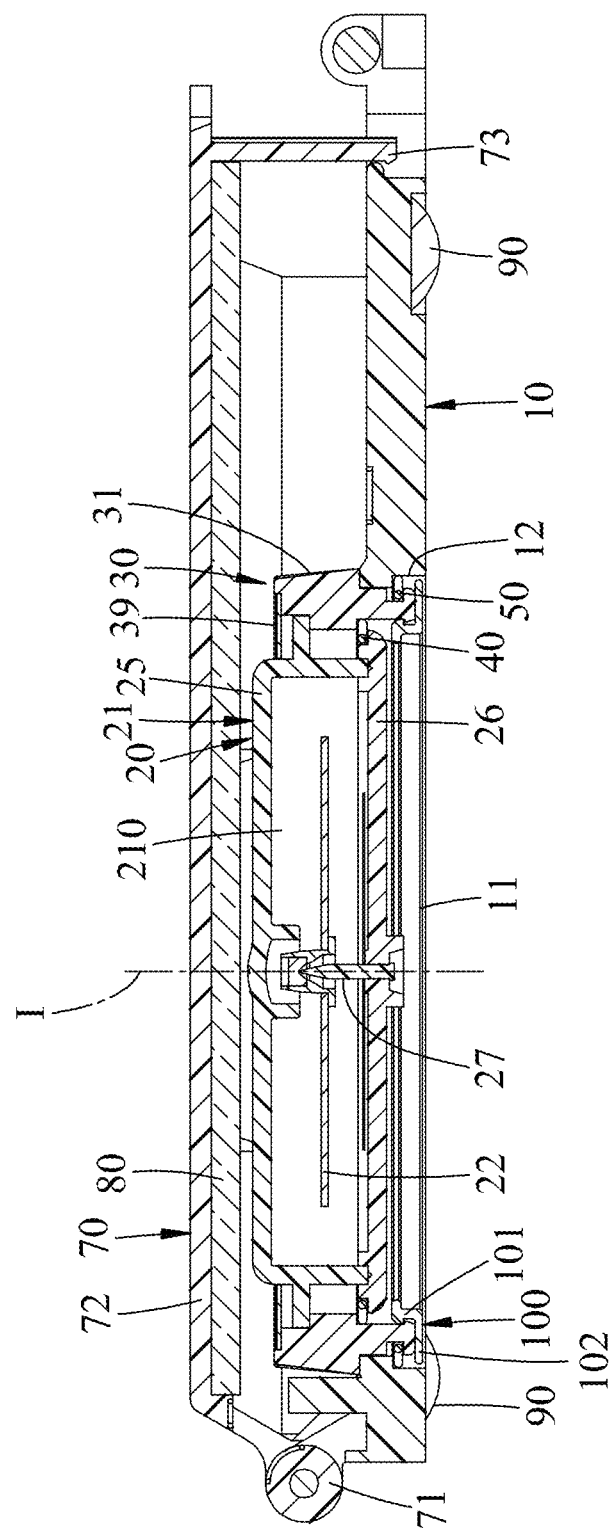
FIG. 4 is a sectional view taken along line IV-IV of FIG. 3.
Figure 9:
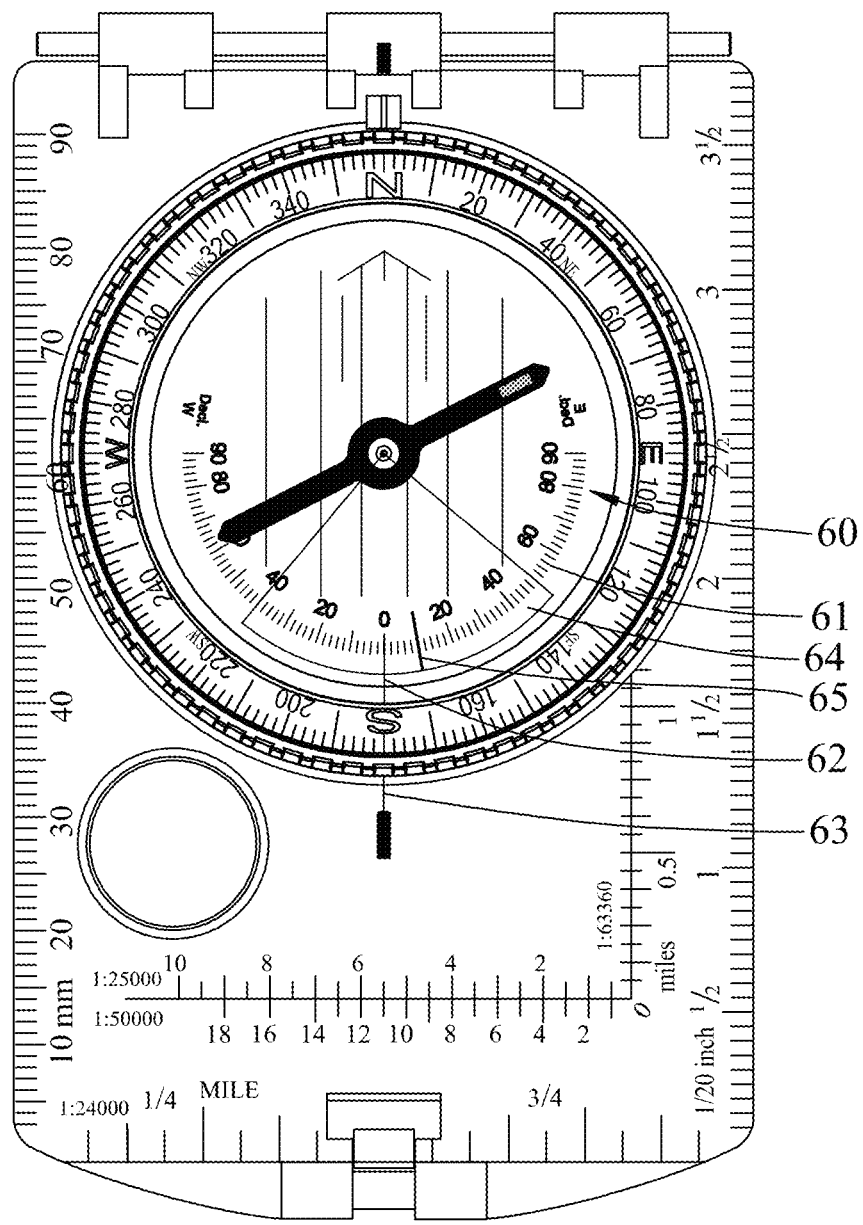
FIG. 9 is a schematic view illustrating a state when the embodiment is handled to measure a slope.

With reference to FIGS. 1, 4 and 9, the slope measuring unit 60 includes a slope graduation dial 61 which is formed on the lower shell half 26 of the vial housing 21, a slope aligning line 62 which is aligned with a graduation of the slope graduation dial 61 that represents 0 degree and which is angularly displaced from the orientation aligning line 23 by 180 degrees, a slope reference line 63 which is formed on the base seat 10, an angle measuring plate 64 which is rotatably mounted on the insert pin 27 about the axis (I) and in the enclosed chamber 210 of the vial housing 21, and a slope reading line 65 which is formed on the angle measuring plate 64.

The outer cover unit 70 includes an upper cover member 72 which is hinged to the base seat 10 by means of a hinge 71, and a locking member 73 which is disposed between the upper cover member 72 and the base seat 10. The upper cover member 72 is rotatable relative to the base seat 10 between a closed position and an opened position. The upper cover member 73 is locked to the base seat 10 by means of the locking member 73 in the closed position so as to protect the vial unit 20.

The mirror 80 is mounted on an inner cover surface of the upper cover member 72 to reflect image and light.

The anti-slip pads 90 are mounted on a lower surface of the base seat 10 so as to position the compass device on a map.

The surrounding cover member 100 includes a first cover ring 101 which is disposed inwardly of and engaged with the inner sleeve surface 32 of the rotary sleeve member 31 and below the lower shell half 26 of the vial housing 21 to conceal the first spring wire 40, and a second cover ring 102 which extends radially and outwardly from the first cover ring 101 and which is disposed over a bottom end of the bottom minor surface 35 of the rotary sleeve member 31 toward the inner peripheral surface 12 of the base seat 10 to conceal the second spring wire 50, such that entrance of dust is prevented for ensuring smooth rotation of the vial housing 21 and the rotary sleeve member 31. The first cover ring 101 is integrally formed with the second cover ring 102, and can be retained on the inner sleeve surface 32 of the rotary sleeve member 31 in a snap-fit or screwed manner.

In this embodiment, each of the orientation reading line 13, the advancing line 14, the magnetic needle 22 and the azimuth ring 39 is luminous and reflective to be identified in a dark. Additionally, two luminous reflective lines 241 are formed on the vial housing 21 and at two sides of the orientation aligning arrow 24 to facilitate identification of the orientation aligning arrow 24 in a dark.

With the first spring wire 40 mounted between the vial housing 21 and the rotary sleeve member 31, and the second spring wire 50 mounted between the rotary sleeve member 31 and the inner peripheral surface 12 of the base seat 10, the vial housing 21 is permitted to rotate relative to the rotary sleeve member 31, and the rotary sleeve member 31, along with the vial housing 21, is permitted to rotate relative to the base seat 10 for adjusting magnetic declination and measuring the bearing angle.

Figure 5:
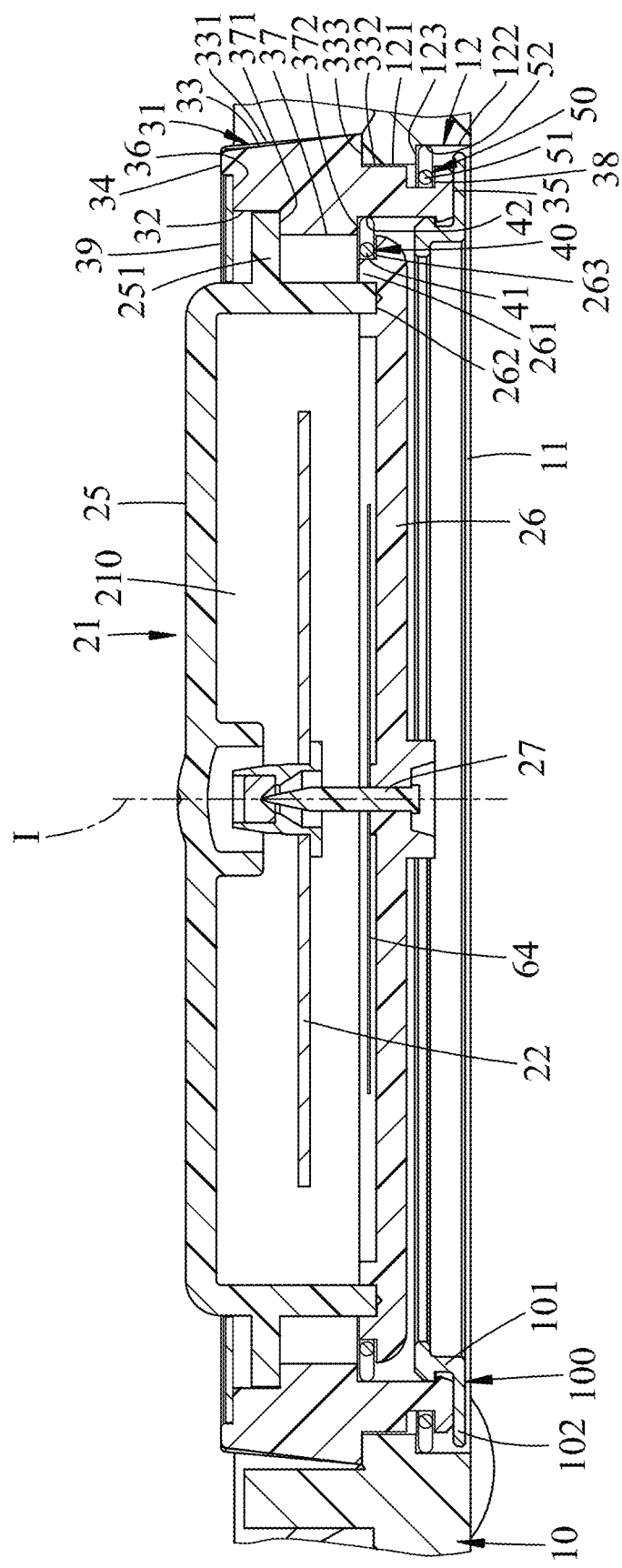
FIG. 5 is a fragmentary sectional view of the embodiment.
Figure 6:
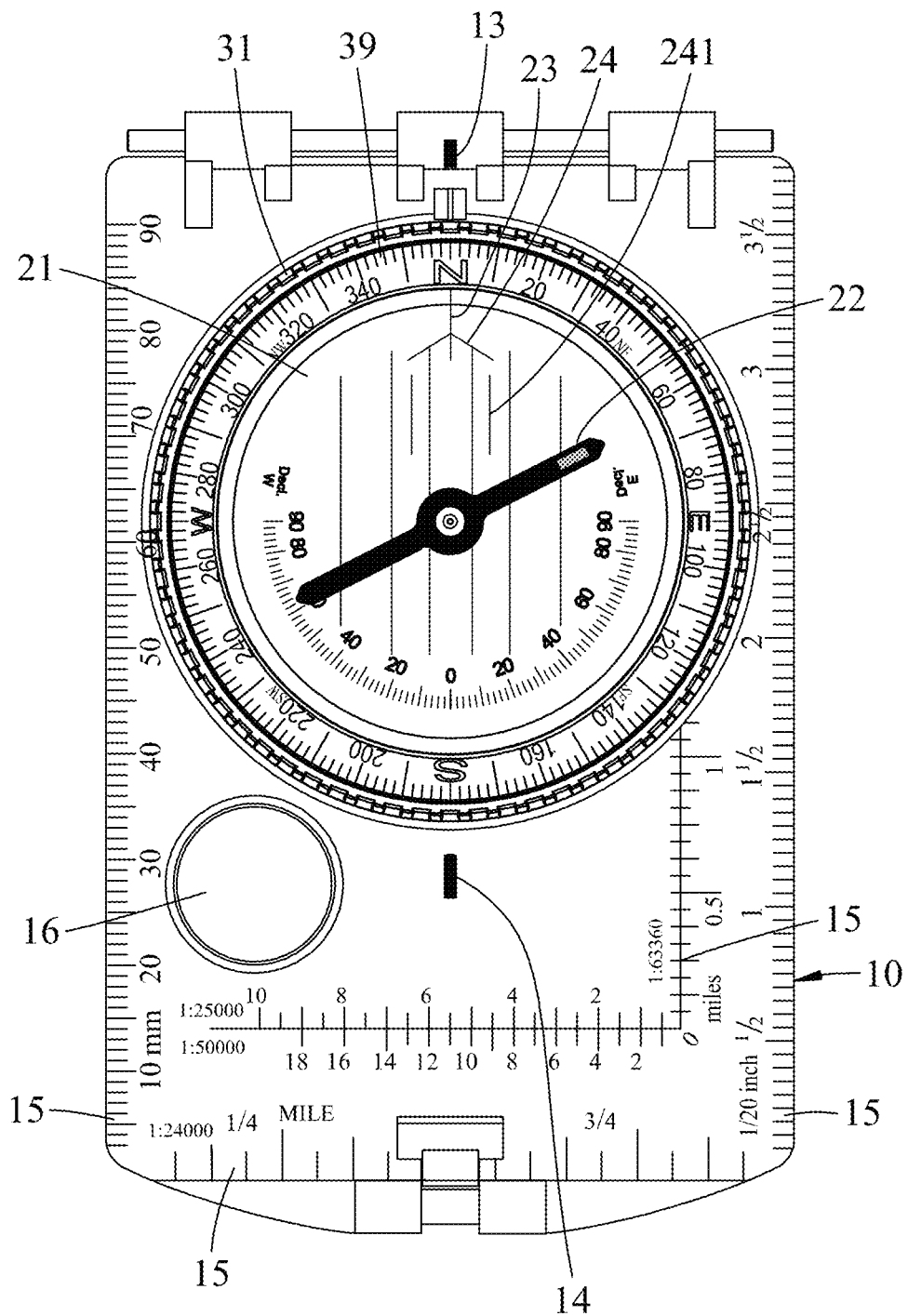
FIG. 6 is a schematic top view of the embodiment, an upper cover member, a mirror and an angle measuring plate being removed for the sake of clarity.
Figure 7:
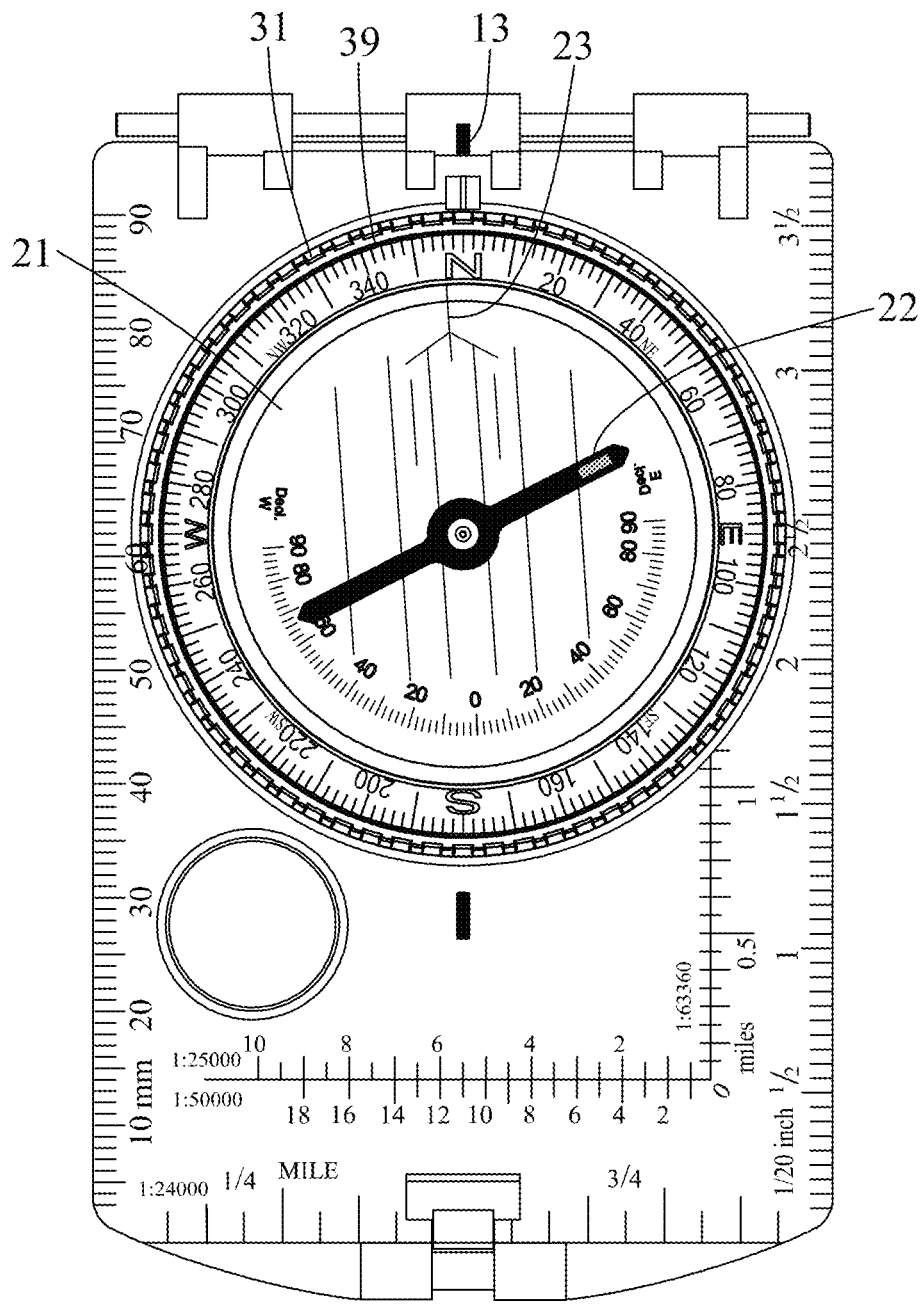
FIG. 7 is a view similar to FIG. 6, illustrating a state when the embodiment is declination adjusted.
Figure 8:
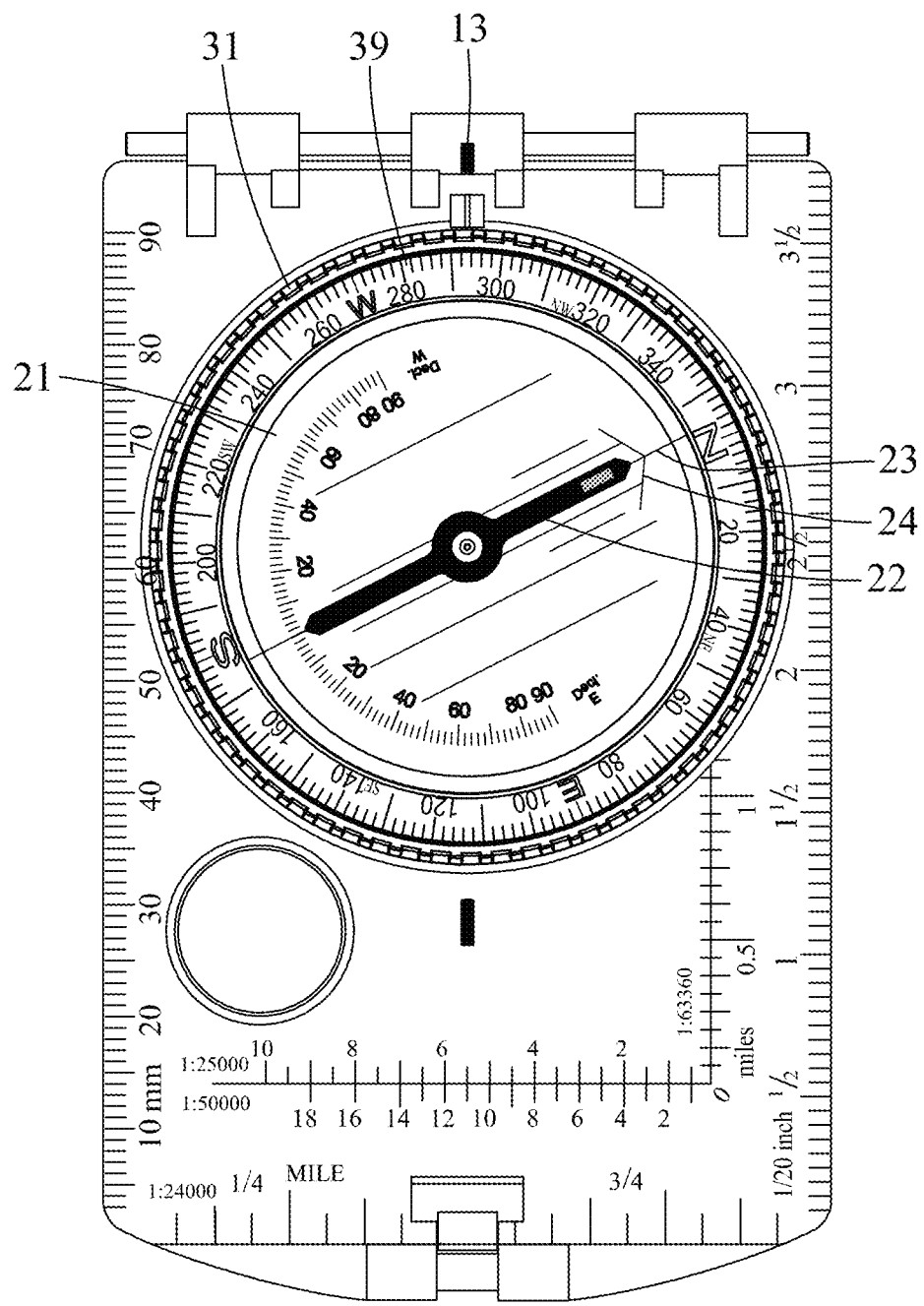
FIG. 8 is a view similar to FIG. 7, illustrating a state when the embodiment is handled to measure a bearing angle.

Specifically, as shown in FIGS. 5 and 6, in the adjusting and measuring operation, the compass device is kept in a horizontal state relative to the ground surface. The vial housing 21 is rotated to have the orientation aligning line 23 aligned with "N" of the scales on the azimuth ring 39 (i.e., 360° or 0°). The rotary sleeve member 31 is then rotated to have "N" of the scales on the azimuth ring 39 aligned with the orientation reading line 13 such that the magnetic needle 22 points the magnetic north. As shown in FIG. 7, subsequently, the vial housing 21 is rotated by an angle in accordance with the on-site magnetic declination to have the orientation aligning line 23 aligned with the bearing angle (for example, since the magnetic declination in Taiwan is about −4°, the vial housing 21 should be rotated to have the orientation aligning line 23 aligned with 356°). With reference to FIG. 8, the rotary sleeve member 31 is then rotated to bring the orientation aligning arrow 24 of the vial housing 21 in alignment with the magnetic needle 22. Thus, the bearing angle can be measured according to the angle value on the azimuth ring 39 that the orientation reading line 13 points.

Referring to FIG. 9, when it is desired to measure the slope, the compass device is kept in an upright state relative to the ground surface and to have the slope aligning line 62 aligned with the slope reference line 63. Thus, the angle measuring plate 64 is swung due to the slope so as to read the slope value according to the value on the slope graduation dial 61 that the slope reading line 65 points.

As illustrated, with the vial housing 21 rotatable relative to the azimuth unit 30, the magnetic declination can be adjusted without the need to use a tool, which facilitates declination adjustment. Moreover, with the first spring wire 40 wrapped on the vial housing 21, and the second spring wire 50 wrapped on the outer sleeve surface 33 of the rotary sleeve member 31, the vial unit 20, along with the first spring wire 40, is disposed within the rotary sleeve member 31 to have the first junctures 42 abutting against the inner sleeve surface 32 so as to resiliently retain the vial unit 20 to the rotary sleeve member 31, and the azimuth unit 30, along with the second spring wire 50, is disposed in the accommodation hole 11 of the base seat 10 to have the second junctures 52 abutting against the inner peripheral surface 12 of the base seat 10 so as to resiliently retain the rotary sleeve member 31 to the base seat 10. The compass device is simple in construction to reduce the manufacturing cost.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A compass device comprising:
   a base seat having an accommodation hole which is bordered by an inner peripheral surface, and an orientation reading line;
   a vial unit including a vial housing which is received in said accommodation hole and spaced apart from said inner peripheral surface, a rotatable magnetic needle which is disposed in said vial housing, and an orientation aligning line and an orientation aligning arrow which are formed on said vial housing and below said magnetic needle;
   an azimuth unit including a rotary sleeve member which is received in said accommodation hole and which is rotatably sleeved around said vial housing, and an azimuth ring which is retained on said rotary sleeve member and which surrounds said magnetic needle, said orientation aligning line and said orientation aligning arrow;
   a first spring wire interposed between said vial housing and said rotary sleeve member, said first spring wire being bent to form a plurality of first clamping sections which are wrapped on said vial housing and each of which extends radially and outwardly to connect with two adjacent ones of said first clamping sections at two first junctures that abut against said rotary sleeve member to resiliently retain said vial housing to said rotary sleeve member and to permit rotation of said vial housing relative to said azimuth unit and position at an angular position for magnetic declination adjustment; and
   a second spring wire interposed between said rotary sleeve member and said inner peripheral surface of said base seat, said second spring wire being bent to form a plurality of second clamping sections which are wrapped on said rotary sleeve member and each of which extends radially and outwardly to connect with two adjacent ones of said second clamping sections at two second junctures that abut against said inner peripheral surface of said base seat to resiliently retain said rotary sleeve member to said base seat and to permit rotation of said azimuth unit and said vial housing relative to said base seat and position at an angular position for bearing angle measurement.

2. The compass device as claimed in claim 1, wherein said first spring wire is configured to be interrupted by a first opening, and said second spring wire is configured to be interrupted by a second opening.

3. The compass device as claimed in claim 2, wherein said vial housing has an upper shell half and a lower shell half coupled with each other to form an enclosed chamber therein, said first spring wire being interposed between said lower shell half and said rotary sleeve member.

4. The compass device as claimed in claim 3, wherein said rotary sleeve member has an inner sleeve surface, an outer sleeve surface, a top minor surface which interconnects said inner and outer sleeve surfaces, a first surrounding shoulder portion which is formed on said inner sleeve surface and which faces downwardly, and a second surrounding shoulder portion which is formed on said outer sleeve surface and which faces upwardly, said first junctures of said first spring wire abutting against said first surrounding shoulder portion, said second clamping sections being mounted on said second surrounding shoulder portion.

5. The compass device as claimed in claim 4, wherein said rotary sleeve member has a third surrounding shoulder portion which is formed on said inner sleeve surface and above said first surrounding shoulder portion and which faces upwardly, said upper shell half having a surrounding flange which extends radially and outwardly and which is seated on said third surrounding shoulder portion, said lower shell half having a surrounding insert protrusion which extends upwardly and which is formed with a surrounding insert slot for inserting engagement of said upper shell half, and a fourth surrounding shoulder portion which surrounds and is formed outwardly of said surrounding insert protrusion and which faces upwardly, said first clamping sections of said first spring wire being mounted on said fourth surrounding shoulder portion such that said first spring wire is retained between said first and fourth surrounding shoulder portions in an up-down direction.

6. The compass device as claimed in claim 4, wherein said inner peripheral surface of said base seat has an upper small-diameter segment, a lower large-diameter segment, and a fifth surrounding shoulder portion formed between said upper small-diameter segment and said lower large-diameter segment and facing downwardly, said second junctures of said second spring wire abutting against said fifth surrounding shoulder portion such that said second spring wire is retained between said second and fifth surrounding shoulder portions in an up-down direction.

7. The compass device as claimed in claim 6, wherein said outer sleeve surface of said rotary sleeve member has a lower smaller-diameter segment which is disposed inwardly of said inner peripheral surface of said base seat, an upper larger-diameter segment which extends outwardly and upwardly of said base seat, and a shoulder seating portion which is formed between said lower smaller-diameter segment and said upper larger-diameter segment and which faces downwardly to be seated against said base seat, said second surrounding shoulder portion being formed on said lower smaller-diameter segment.

8. The compass device as claimed in claim 1, wherein each of said orientation reading line, said magnetic needle and said azimuth ring is luminous and reflective to be identified in a dark, said vial unit further including two luminous reflective lines formed on said vial housing and at two sides of said orientation aligning arrow to facilitate identification of said orientation aligning arrow in a dark.

9. The compass device as claimed in claim 3, further comprising a slope measuring unit including a slope graduation dial which is formed on said lower shell half of said vial housing, a slope aligning line which is aligned with a graduation of said slope graduation dial that represents 0 degree and which is angularly displaced from said orientation aligning line by 180 degrees, a slope reference line which is formed on said base seat, an angle measuring plate which is rotatably mounted in said enclosed chamber of said vial housing, and a slope reading line which is formed on said angle measuring plate.

10. The compass device as claimed in claim 4, further comprising a surrounding cover member including a first cover ring which is disposed inwardly of and engaged with said inner sleeve surface of said rotary sleeve member and below said lower shell half of said vial housing to conceal said first spring wire, and a second cover ring which extends radially and outwardly from said first cover ring and which is disposed over a bottom end of said rotary sleeve member toward said inner peripheral surface of said base seat to conceal said second spring wire.

\* \* \* \* \*